United States Patent [19]

Drexler et al.

[11] Patent Number: 5,982,910
[45] Date of Patent: *Nov. 9, 1999

[54] METHOD AND CIRCUIT ARRANGEMENT FOR UNDERSAMPLING IN THE CASE OF MOVEMENT ESTIMATION

[75] Inventors: Michael Drexler, Gehrden; Marco Winter, Garbsen, both of Germany

[73] Assignee: Deutsche Thomson-Brandt GmbH, Villingen-Schwenningen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/604,061

[22] Filed: Feb. 20, 1996

[30] Foreign Application Priority Data

Mar. 16, 1995 [DE] Germany ............... 195 09 418

[51] Int. Cl.$^6$ .................................................... G06K 9/00
[52] U.S. Cl. ...................... 382/107; 348/699; 382/236
[58] Field of Search .................. 382/232, 236, 382/239, 107, 248, 250; 348/407, 416, 431, 402, 413, 424, 699, 451, 452, 154, 155; 345/474, 475

[56] References Cited

U.S. PATENT DOCUMENTS

| 5,200,820 | 4/1993 | Gharavi ................................ 348/699 |
| 5,398,068 | 3/1995 | Liu et al. ............................ 348/416 |
| 5,701,164 | 12/1997 | Kato .................................... 348/699 |
| 5,719,630 | 2/1998 | Senda .................................. 348/416 |

FOREIGN PATENT DOCUMENTS

| 255289A2 | 2/1988 | European Pat. Off. ......... H04N 7/13 |
| 0358625A2 | 3/1990 | European Pat. Off. ......... H04N 5/14 |
| 460997A1 | 12/1991 | European Pat. Off. ......... G06F 15/70 |
| 3924541A1 | 1/1991 | Germany ....................... H04N 7/13 |
| 4023449C1 | 1/1992 | Germany ....................... H04N 7/13 |
| 4342305A1 | 6/1995 | Germany ....................... H04N 5/14 |
| 2277004 | 10/1994 | United Kingdom ............. H04N 5/14 |
| 9219068A1 | 10/1992 | WIPO ............................. H04N 5/14 |

OTHER PUBLICATIONS

Hildenbrand et al., *Motion Estimation In The Hermes Videocodec, Frequenz*, Nov. 1993, pp. 303–309, Germany.
Artieri et al. *A Chip Set Core For Image Compression, IEEE Transaction on Consumer Electronics*, Aug. 1990, pp. 395–402, United States.
*New Fast Algorithms For The Estimation of Block Motion Vectors*, by B. Liu et al., published in the IEEE Transactions on Circuits and Systems for Video Technology, vol. 3, No. 2, S. 148 157, Apr. 1994.

Primary Examiner—Amelia Au
Assistant Examiner—Timothy M. Johnson
Attorney, Agent, or Firm—Joseph S. Tripoli; Ronald H. Kurdyla; Alexander J. Burke

[57] ABSTRACT

In the case of the storage or transmission of moving images, it is frequently necessary to reduce the large number of information items by means of suitable compression methods. In order to estimate the movement, the image to be coded is in this case split into blocks, and each of these reference blocks R is compared with blocks of the same size of the preceding image, and a movement information item is derived. Conventional methods for movement estimation in this case use all the pixels in the reference block R and in the search area S. Since this very complicated method requires very fast, and thus expensive, hardware, the so-called quincunx undersampling is applied to the search area S. In the case of the reference block R, one quincunx undersampled pixel is used for even parity of the movement vector and the other quincunx undersampled pixel is used for odd parity, depending on which position is being investigated. For the search area S, it is then necessary to store only half the pixels which are required for movement estimation. The memory requirement and the bandwidth of the memory are thus reduced by half.

13 Claims, 4 Drawing Sheets

METHOD AND CIRCUIT ARRANGEMENT FOR UNDERSAMPLING IN THE CASE OF MOVEMENT ESTIMATION

The invention relates to a method and a circuit arrangement for undersampling in the case of movement estimation.

BACKGROUND OF THE INVENTION

In the case of the storage or transmission of moving images, it is frequently necessary to reduce the large number of information items by means of suitable compression methods. Methods for movement estimation, which utilize the correlations between individual images, are used for this purpose.

In order to estimate the movement, the image to be coded is split into blocks and each of these reference blocks are compared with blocks of the same size within a sub area of a preceding or subsequent image, the so-called search window. The sum of the absolute values of the differences between the pixel values of the reference block and the corresponding pixel values of the search window is used, for example, in this case as the comparison criterion (cost function). A movement vector, which indicates the offset of these blocks calculated in pixels, is determined for each reference block for that block in the search window which in each case provides the best correspondence. As a result of this movement estimation, only the reference image is required for the movement compensation of the complete image, and the associated movement vector for each reference block. In general, exact reconstruction does not, of course, take place.

Known methods for movement estimation use all the pixels in the reference block and in the search area (full pel full search) in order to find the optimum movement vector having the smallest cost function. However, this method requires very fast, and thus expensive, hardware.

SUMMARY OF THE INVENTION

The invention is based on the object of specifying a method for undersampling in the case of movement estimation, with a small memory requirement and/or small memory bandwidth while the smallest cost function can at the same time be reliably determined.

The invention is based on the further object of specifying a circuit arrangement for use of the method according to the invention.

Undersampling of the reference block and of the search area can be carried out in order to reduce the computation time and the memory requirement in the case of movement estimation. The omission of the individual columns and/or lines (orthogonal undersampling) can, however, lead to unsatisfactory results since, under some circumstances, the point having the actually smallest cost function, and thus the correct movement vector, is not found.

The number of incorrectly determined movement vectors for a predetermined level of undersampling can advantageously be considerably reduced by using quincunx undersampling instead of orthogonal undersampling. In the case of said quincunx undersampling, the pixels at the positions omitted in the preceding line or column, respectively, are used in each following line or column, respectively. In this case, fixed quincunx undersampling can be applied either to the reference block or to the search area.

If fixed quincunx undersampling is carried out for the reference block, then one set of pixels for the search area is used in some cases, and the other set of pixels in other cases, depending on the vector being investigated. Although only half the pixels are used in each case, all the pixels in the search area must be available for the search, and the search area memory therefore has to include all the pixels.

Fixed quincunx undersampling is advantageously carried out in the search area and, in the case of the reference block, one set of quincunx-undersampled pixels is used for even parity of the movement vector, and the other set of quincunx-undersampled pixels for odd parity, depending on which position is being investigated.

In principle, the method according to the invention for undersampling in the case of movement estimation, during which reference blocks in the image to be coded are compared with blocks of the same size of at least one image within a search area and a movement information item for these reference blocks is derived therefrom, comprises fixed undersampling being used in the search area, and the pixels which have been undersampled corresponding to the search area pixel undersampling being used in the case of the reference block, depending on which block position is being investigated.

Advantageous developments of the method according to the invention are derived.

In principle, the circuit arrangement according to the invention for a method for undersampling in the case of movement estimation, during which reference blocks in the image to be coded are compared with blocks of the same size of at least one image within a search area and a movement information item for these reference blocks is derived therefrom, is split into circuit elements to which the search area lines are applied and which supply the error between the pixel values of the search area pixels and the pixel values of the reference pixels for each of the search area lines, the line error for movement information items of even parity being output at a first output of each circuit element, and the line error for movement information items of odd parity being output at a second output, and the error between the overall search area and the overall current reference block being calculated in an adder stage from the line errors, and the movement information item for the reference block being calculated therefrom.

Advantageous developments of the circuit arrangement according to the invention are derived.

DRAWINGS

Exemplary embodiments of the invention are described with reference to the drawings, in which:

FIG. 1 shows the movement estimation method in the case of a quincunx undersampling according to the invention for vectors of even parity (a) and odd parity (b), FIG. 2 shows the pixel arrangement in the reference block and the search area in the case of a reference block size of 4*4 pixels, FIG. 3 shows a block diagram of a circuit arrangement for the conventional movement estimation (full pel full search), FIG. 4 shows a detail of the circuit arrangement from FIG. 3, FIG. 5 shows a detail from a circuit arrangement for quincunx movement estimation, FIG. 6 shows a detail from a circuit arrangement which is modified from that in FIG. 5.

DETAILED DESCRIPTION OF THE DRAWINGS

Figure 1A:
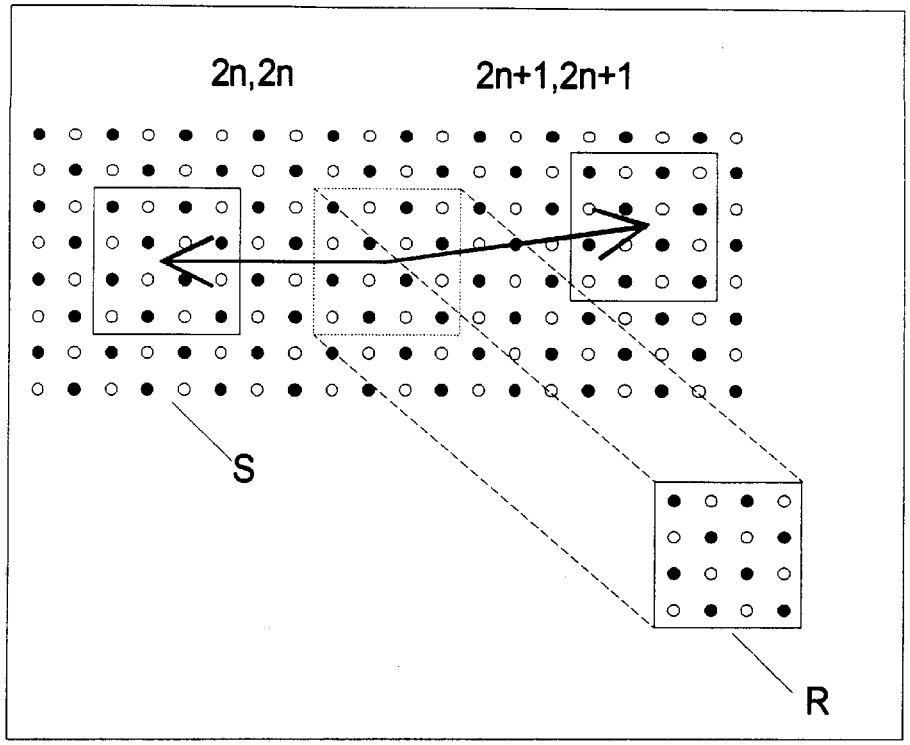
Figure 1B:
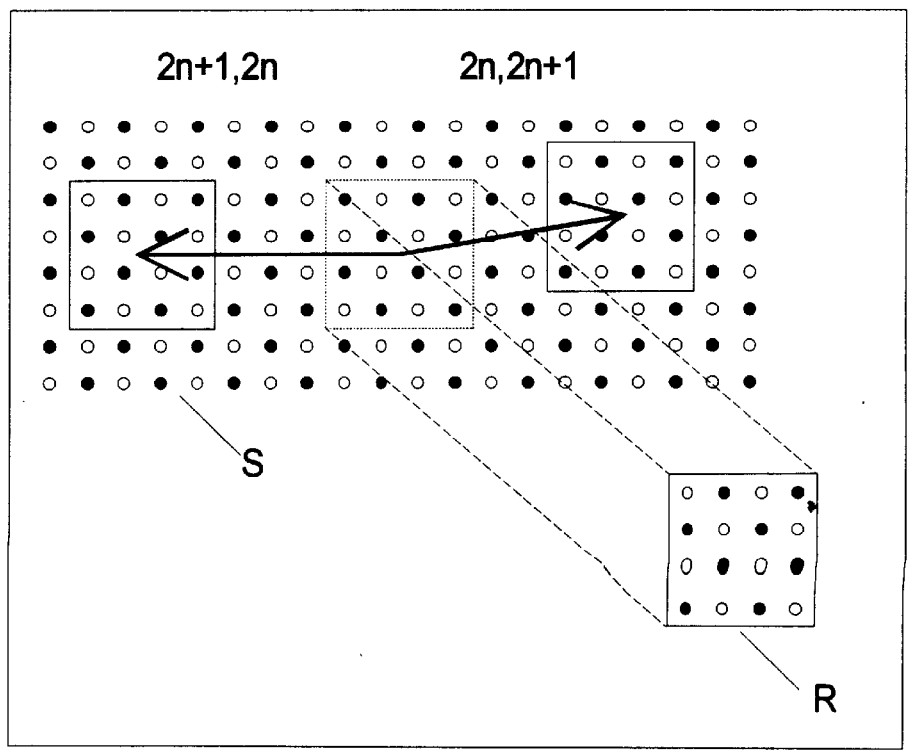

FIG. 1 shows the method according to the invention for quincunx undersampling in the case of movement estimation, the pixels used being symbolized by solid circles and the unused pixels by empty circles. The pixels at the positions omitted in the preceding line or column, respectively, are used in each following line or column, respectively. Fixed quincunx undersampling is carried out in the search area S while, in contrast, in the case of the reference block R, one set of quincunx-undersampled pixels is used for even parity of the movement vector, and the other set of quincunx-undersampled pixels is used for odd parity, depending on which position is being investigated. FIG. 1$a$ shows this for vectors of even parity (the horizontal vector component and the vertical vector component are either both even or both odd), and FIG. 1$b$ for vectors of odd parity (one vector component is even and the other odd).

All the pixels in the reference block R therefore have to be available, but this does not result in any disadvantage since they are required in any case for the subsequent compensation. In contrast, for the search area S, only half the pixels which are required for the movement estimation now need to be stored. In consequence, the memory requirement and the bandwidth of the memory are reduced by half in comparison with conventional methods for movement estimation, so that only a smaller number of memory chips are required, and they are also cheaper.

Figure 2:
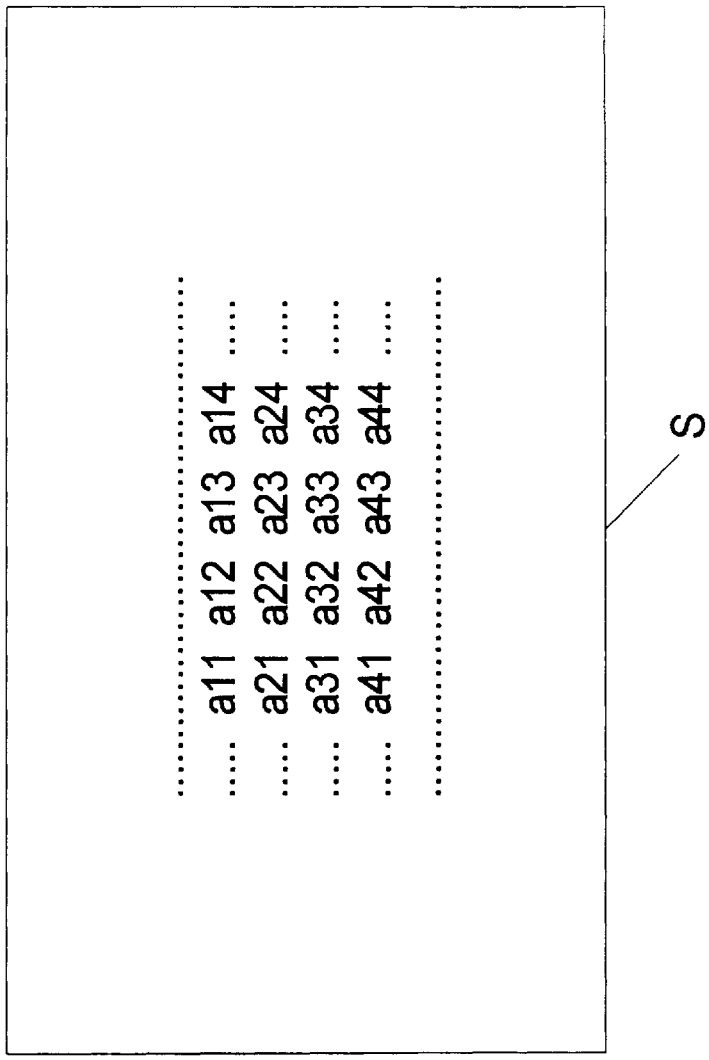
Figure 2:
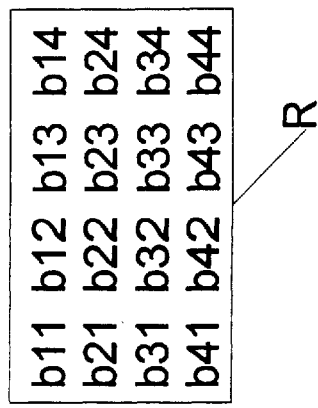

The individual pixels (a11, a12, a13, . . . ) in the search window S are preferably read into a circuit for movement estimation from one end of the search area horizontally to the other. The pixels (b11, b12, b13, . . . ) in the reference block R are, in contrast, permanently stored in the circuit used for movement estimation, throughout the entire search process. For simplicity, a block size of 4*4 pixels is assumed for the reference block R in the following text, as is shown in FIG. 2.

Figure 3:
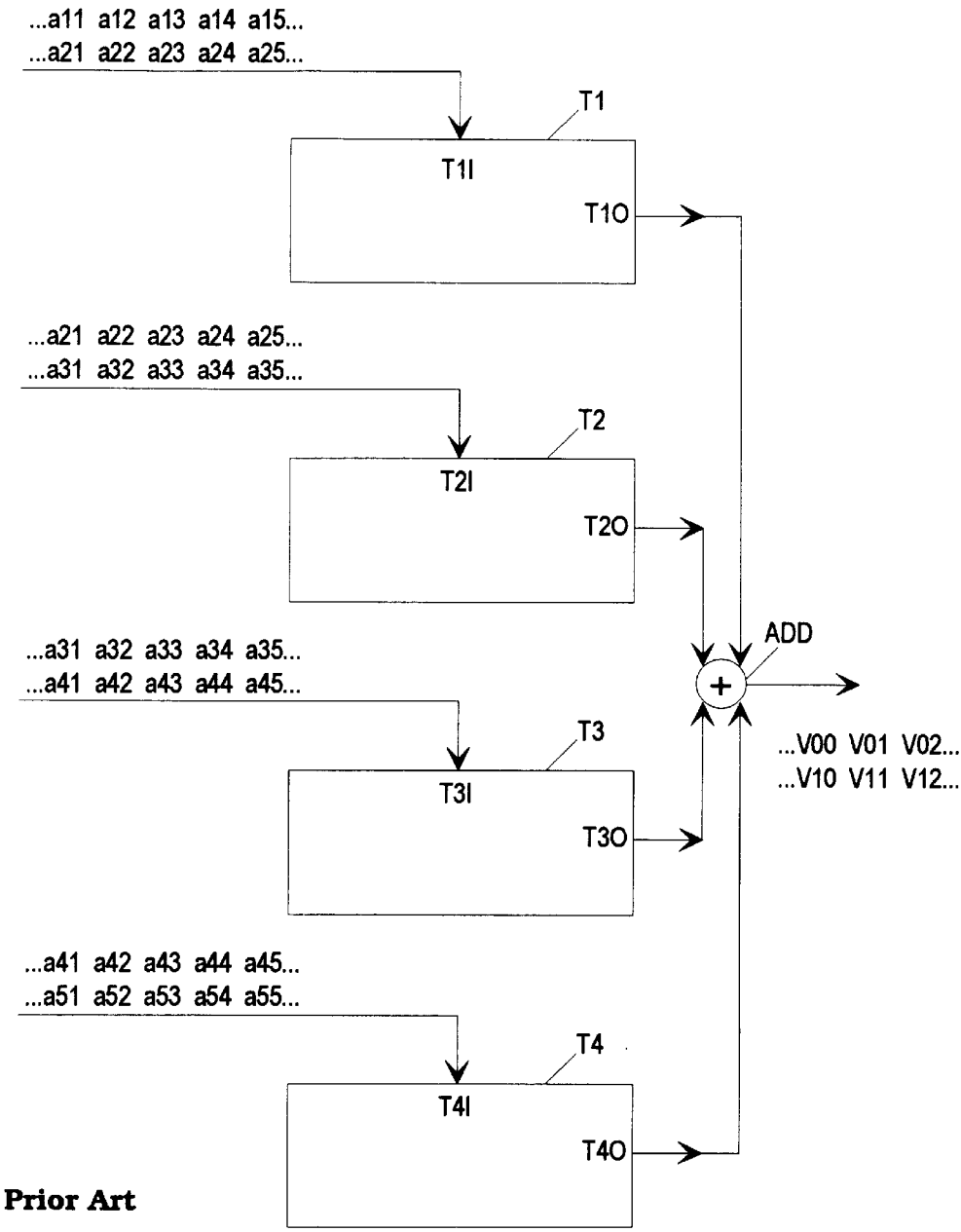

FIG. 3 shows a block diagram of a circuit arrangement for conventional movement estimation. The circuit arrangement is split into circuit elements T1 to T4 which are each used for comparison of a search area line with one of the four lines in the reference block. The error between the overall search area and the overall current reference block is then calculated in an adder stage ADD from the line errors.

Figure 4:
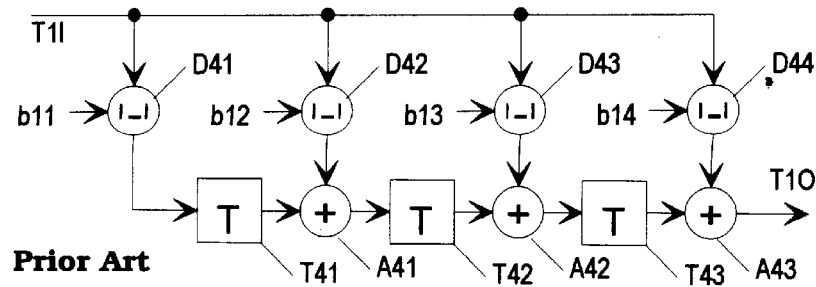

FIG. 4 shows the method of operation of a circuit element using the example of the circuit element T1. In the first clock cycle, the search area pixel $a_{11}$ is applied to the input T1I of the circuit element T1 and thus to the absolute subtractors D41 to D44. The pixel value error $|b_{11}-a_{11}|$ is now calculated in the subtractor D41 to which the reference pixel $b_{11}$ is permanently applied, at a second input. This intermediate result is stored until the next clock cycle, in a downstream timer T41 which is in general a register. During the next clock cycle, the search area pixel $a_{12}$ is now read into the circuit element. The pixel value error $|b_{12}-a_{12}|$ is now calculated with the aid of the subtractor D42 to which the reference pixel $b_{12}$ is applied at a second input. The pixel value errors $|b_{11}-a_{11}|$ and $|b_{12}-a_{12}|$ are added in a first adder stage A41 and are buffer-stored in a further timer T42. After two further clock cycles, in which the search area pixels $a_{13}$ and $a_{14}$ are read into the circuit element and are appropriately processed, the pixel value error of the entire line $|b_{11}-a_{11}|+|b_{12}-a_{12}|+|b_{13}-a_{13}|+|b_{14}-a_{14}|$ is present at the output of the circuit element T10.

The same processing steps are likewise carried out in the other circuit elements T2, T3, T4 so that, after addition of the line errors in the adder stage ADD, the cost function $V_{00}=|b_{11}-a_{11}|+|b_{12}-a_{12}|+|b_{13}-a_{13}|+|b_{14}-a_{14}|+|b_{21}-a_{21}|+|b_{22}-a_{22}|+ \ldots +|b_{44}-a_{44}|$ is obtained. After the next clock cycle, the cost function $V_{01}=|b_{11}-a_{12}|+|b_{12}-a_{13}|+|b_{13}-a_{14}|+|b_{14}-a_{15}|+|b_{21}-a_{22}|+|b_{22}-a_{23}|+ \ldots +|b_{44}-a_{45}|$ is then available for the search area block, which has been shifted horizontally by one pixel. Once the reference block has been completely shifted horizontally over the search area, the search area pixels are horizontally scanned again in the next pass and are processed by the circuit, but now being offset vertically by one pixel. Thus, for example, the following cost function results for the case in which the search area pixels $a_{21}$ to $a_{24}$ have been read into the circuit element T1 and the corresponding search area pixels have been read into the circuit elements T2 to T4: $V_{10}=|b_{11}-a_{21}|+|b_{12}-a_{22}|+|b_{13}-a_{23}|+|b_{14}-a_{24}|+|b_{21}-a_{31}|+|b_{22}-a_{32}|+ \ldots +|b_{44}-a_{54}|$.

As many passes are now carried out as are indicated for the vertical value range of the vectors. It is then simple to determine the minimum of the cost functions, which are present sequentially in time, at the output.

Figure 5:
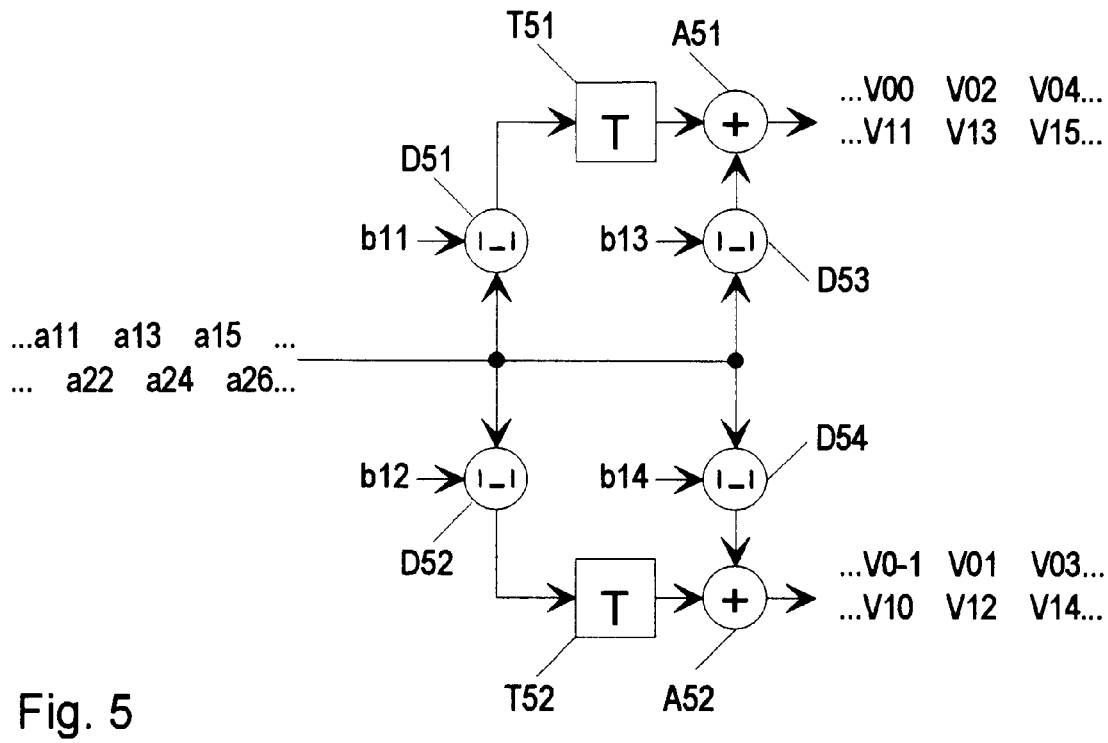

FIG. 5 shows a circuit element according to the invention using quincunx undersampling. Each circuit element now has two outputs, one output in each case for vectors of even parity, and one for vectors of odd parity. The pixels in the search area, which has now been quincunx undersampled, pass at half the data rate to the subtractors D51 to D54. The reference block pixels $b_{11}$ to $b_{14}$ are in each case applied to the second input of the subtractors, one set of quincunx undersampled reference block pixels being stored in the upper part of the circuit, and the other set of quincunx undersampled reference block pixels being stored in the lower part. If the search area pixel $a_{11}$ has been read in in the first clock cycle, then the pixel value error $|b_{11}-a_{11}|$ is calculated in the subtractor D51, to which the reference pixel $b_{11}$ is permanently applied. This intermediate result is stored in the downstream timer T51, until the next clock cycle. The search area pixel $a_{13}$ is now read in during the next clock cycle, because of the quincunx undersampling. The pixel value error $|b_{13}-a_{13}|$ is calculated with the aid of the subtractor D53, to which the reference pixel $b_{13}$ is applied. This pixel value error is added in the adder stage A51 to the pixel value error $|b_{11}-a_{11}|$, which was previously stored in the timer T51, and is read out via a first output.

The same processing steps are likewise carried out in the other circuit elements. The cost function
$V_{00}=|b_{11}-a_{11}|+|b_{13}-a_{13}|+|b_{22}-a_{22}|+ \ldots +|b_{44}-a_{44}|$
is thus produced after addition of the line errors. After the next clock cycle, the line errors are read out of the second outputs so that, after they have been added, the cost function
$V_{01}=|b_{12}-a_{13}|+|b_{14}-a_{15}|+|b_{21}-a_{22}|+ \ldots +|b_{43}-a_{44}|$
is available for the search area block which has been shifted horizontally by one pixel.

In the next pass, the search area lines are again offset by one pixel vertically, so that the following cost function, for example, is obtained:
$V_{10}=|b_{12}-a_{22}|+|b_{14}-a_{24}|+|b_{21}-a_{31}|+ \ldots +|b_{43}-a_{53}|$ Once all the passes have been completed, the minimum can then once again be determined from the cost functions which now occur sequentially in time.

Figure 6:
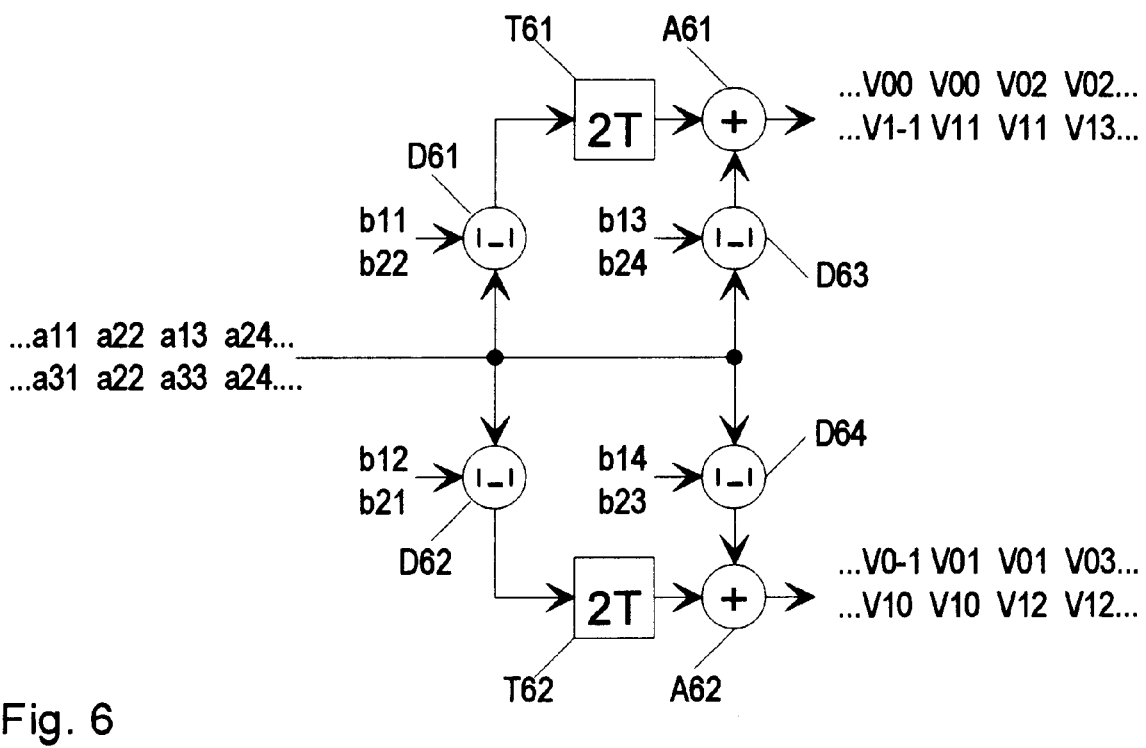

Alternatively, FIG. 6 shows a circuit element which is admittedly operated at the same data rate as in the case of a conventional movement estimation but in which only half the parallel circuit elements are required compared to the previous circuit arrangements. In contrast to the circuit element from FIG. 5, the search area pixels are in this case supplied to the circuit having been scanned in zigzag form over two adjacent lines and two reference block pixels are now present in stored form in each subtractor, and a changeover is made between them, sequentially in time with the clock.

If the first search area pixel all is read in in the first clock cycle, then the pixel value error $|b_{11}-a_{11}|$ is calculated in the subtractor D61 to which the reference pixel $b_{11}$ is applied. This intermediate result is stored in the downstream timer T61 until the next but one clock cycle. The search area pixel $a_{22}$ is now read in during the next clock cycle. The reference pixel $b_{22}$ is now applied to the subtractor D61 so that the pixel value error $|b_{22}-a_{22}|$ is calculated. This intermediate result is now likewise stored in the timer T61 for two clock cycles. The search area pixel $a_{13}$ is read in a further clock cycle later. At the same time, the initially stored intermediate result $|b_{11}-a_{11}|$ is read out from the timer and is added in a adder stage A61 to the result $|b_{13}-a_{13}|$ which the subtractor D63 supplies. The timer supplies $|b_{11}-a_{11}|$ and the subtractor D63 supplies the result $|b_{24}-a_{24}|$, once again one clock cycle later. In order to obtain the value for the line error, the sum of these two pixel errors is then added to the value which the adder stage A61 has supplied during the preceding clock cycle. The cost function $V_{00}$ for the movement vector now results once again from the sum of the line errors of the individual circuit elements.

During the last-mentioned clock cycle and the clock cycle following it, the values are read out at the second outputs simultaneously, so that, after they have been added, the cost function $V_{01}$ is available for the search area block shifted horizontally by one pixel. Since, in comparison with FIG. 5, only the circuit arrangement has been changed, but the undersampling has remained the same, the same values result in this case as when the circuit element from FIG. 5 was used.

As an alternative to that which was previously known, the search area can also be limited to a field. In the case of this one-sided movement estimation, only a field memory is now required, instead of an image memory.

The invention can be used, for example, in encoders for MPEG1, MPEG2 or for videotelephone encoding.

What is claimed is:

1. Method for undersampling in image motion estimation employing single pixel resolution pixel block comparison, comprising the steps of:

comparing reference blocks in an image to be coded, with blocks of the same size of at least one image within a search area; and deriving a movement information item for these reference blocks based on said comparison by, comparing pixels in a first predetermined quincunx undersampling pixel pattern in said search area with pixels having said first quincunx undersampling pattern in a current reference block having a first relative position in said search area, and comparing pixels in said same first predetermined quincunx undersampling pixel pattern in said search area with pixels having the complement of said first quincunx undersampling pattern in a current reference block having a second relative position in said search area, wherein said first relative position is offset by one pixel with respect to said second relative position.

2. Method according to claim 1, wherein pixels having said first quincunx undersampling pixel pattern in said current reference block and pixels having said complement of said first quincunx undersampling pattern in said current reference block are used for a motion compensated interpolation according to the movement information item determined for said current reference block.

3. Method according to claim 1, including the step of selecting between said first quincunx undersampling pixel pattern and said complement of said first quincunx undersampling pattern based on field parity of pixel blocks being compared.

4. Method according to claim 1, wherein search area pixels are scanned horizontally.

5. Method according to claim 1, wherein search area pixels for two successive lines or columns are scanned in a zigzag shape.

6. Method according to claim 1, wherein, in said first quincunx undersampling pixel pattern and said complement of said first quincunx undersampling pattern, every other image line is used, and the search area is thereby limited to fields.

7. Method according to claim 1, wherein,
   said first quincunx undersampling pixel pattern and said complement of said first quincunx undersampling pattern are the only patterns used in pixel block comparison performed for an image.

8. Apparatus for undersampling in image motion estimation, comprising:

means for comparing reference blocks in an image to be coded, with blocks of substantially the same size of at least one image within a search area; and means for deriving a movement information item for these reference blocks based on said comparison by, comparing pixels in a first predetermined quincunx undersampling pixel pattern in said search area with pixels having said first quincunx undersampling pattern in a current reference block having a first relative position in said search area, and comparing pixels in said same first predetermined quincunx undersampling pixel pattern in said search area with pixels having the complement of said first quincunx undersampling pattern in a current reference block having a second relative position in said search area, wherein said first relative position is offset by one pixel with respect to said second relative position.

9. Apparatus according to claim 8, including,
   means for selecting between said first quincunx undersampling pixel pattern and said complement of said first quincunx undersampling pattern based on field parity of pixel blocks being compared.

10. Apparatus according to claim 9, further including
    means for calculating a pixel value error;
    timers for buffer storing said pixel value error;
    and adder stages for addition of pixel value errors;
    wherein quincunx undersampled reference block pixels are stored in said means for calculating said pixel value error and quincunx undersampled search area pixels are applied sequentially to said means for calculating said pixel value error.

11. Apparatus according to claim 10, wherein two reference block pixels are stored in said means for calculating said pixel value error, and said two reference block pixels are applied sequentially in time using a clock, and two successive output values are added in producing a motion information item.

12. Apparatus according to claim 10, including absolute value subtractors for calculating said pixel value error.

13. Apparatus according to claim 10, wherein registers are used as said timers.

* * * * *